United States Patent [19]

Gynn et al.

[11] Patent Number: 5,521,232
[45] Date of Patent: May 28, 1996

[54] MOLDING COMPOSITION AND PROCESS FOR LOW PRESSURE MOLDING OF COMPOSITE PARTS

[75] Inventors: Gilbert M. Gynn, Dublin; David W. Hearn, Grove City, both of Ohio

[73] Assignee: Ashland Inc., Russell, Ky.

[21] Appl. No.: 282,139

[22] Filed: Jul. 28, 1994

[51] Int. Cl.⁶ .................................................. C08K 3/34
[52] U.S. Cl. .................... 523/513; 523/511; 523/514; 523/516; 523/527; 523/222; 523/223; 524/445; 524/447
[58] Field of Search ................... 523/514, 222, 523/223, 516, 511, 513, 527; 524/445, 447

[56] References Cited

U.S. PATENT DOCUMENTS

| | | | |
|---|---|---|---|
| Re. 31,975 | 8/1985 | Comstock et al. | 523/514 |
| 2,757,160 | 7/1956 | Anderson | 523/514 |
| 3,290,164 | 12/1966 | Ferrigno | 524/144 |
| 4,374,215 | 2/1983 | Atkins | 523/514 |
| 4,421,894 | 12/1983 | O'Connor et al. | 523/500 |
| 4,478,970 | 10/1984 | Abolins et al. | 524/447 |
| 4,876,296 | 10/1989 | Miller et al. | 523/200 |
| 4,997,703 | 3/1991 | Gehrig | 428/283 |
| 5,100,935 | 3/1992 | Iseler et al. | 523/514 |
| 5,236,976 | 8/1993 | Michaels | 523/514 |
| 5,244,958 | 9/1993 | Goodman | 524/445 |
| 5,246,983 | 9/1993 | Shibata et al. | 523/513 |
| 5,281,634 | 1/1994 | Hesse et al. | 523/514 |
| 5,319,003 | 6/1994 | Gomez et al. | 595/170 |

FOREIGN PATENT DOCUMENTS

| | | | |
|---|---|---|---|
| 690344 | 2/1969 | Canada | 524/445 |
| 2102592 | 5/1987 | Japan | 524/445 |
| 1234484 | 9/1989 | Japan | 524/445 |

OTHER PUBLICATIONS

*Engelhard T1–1006 EC3336 Jun. 1986 Specialty Aluminum Silicates* Side 6.
Technology of Bakelite Low Profile FRP Molding F46568, K. E. Atkins, See p. 1 last paragraph.

*Primary Examiner*—Paul R. Michl
*Assistant Examiner*—Olga Asinovsky
*Attorney, Agent, or Firm*—Mary E. Picken

[57] ABSTRACT

The invention is a molding composition and molding process for use in the manufacture of lightweight composite vehicle parts and construction parts having smooth surfaces. The molding process may be at low pressures. The composition includes kaolin clay filler and, optionally, hydrophilic fumed silica thixotrope.

19 Claims, No Drawings

MOLDING COMPOSITION AND PROCESS FOR LOW PRESSURE MOLDING OF COMPOSITE PARTS

This invention is a molding composition and a molding process for making light weight composite vehicle and construction parts having superior surface smoothness. The molding process can be accomplished at lower than conventional pressures.

BACKGROUND OF THE INVENTION

Fiberglass reinforced plastics (FRP) are used in a wide variety of applications because of their excellent balance of physical properties, cost, and processibility. This has led FRPs to be of use in the automotive industry in applications as diverse as oil pans, heat shields, rocker covers, suspension parts, grill opening panels, and exterior body panels. FRPs are used in construction as well. Each of these applications takes advantage of some of the unique property balance of the unsaturated polyester or vinyl ester FRPs.

Unsaturated polyester FRPs have been used in exterior body panel applications due to their corrosion resistance, strength, and resistance to damage. The automotive industry has very stringent requirements for the surface appearance of these body panels. This desirable smooth surface is generally referred to as a "class A" surface. Unsaturated polyester resins typically shrink 5–8% on a volume basis when they are cured. In an FRP, this results in a very uneven surface because the glass fibers cause peaks and valleys when the resin shrinks around them. Special ingredients, called thermoplastic low profile additives, have been developed in order to help these materials meet the stringent surface smoothness requirements for a class A surface. These LPAs are typically thermoplastic polymers which compensate for curing shrinkage by creating extensive microvoids in the cured resin. Unsaturated polyester resins can now be formulated to meet or exceed the smoothness of metal parts which are also widely used in these applications.

In addition to LPAs, formulations contain large amounts of inorganic fillers such as calcium carbonate. These fillers contribute in two critical ways towards the surface smoothness of these compositions. First, the fillers dilute the resin mixture. Typically, there may be twice as much filler as resin on a weight basis in a formulation. This reduces the shrinkage of the overall composition simply because there is less material undergoing shrinkage. The second function of the filler is in aiding the microvoiding that LPAs induce. These stress concentration points seem to induce more efficient void formation.

In recent years, there has been added pressure on the automotive manufacturers to reduce the weight of cars in order to improve gas mileage. While FRPs have an advantage in this respect compared to competitive materials because of lower specific gravity, the fillers mentioned previously cause the part to be heavier than necessary. Most inorganic fillers have fairly high densities. Calcium carbonate, the most commonly used filler, has a density of about 2.71 g/cc, compared to a density of about 1.2 g/cc for the cured unsaturated polyester. A common FRP material used in body panel applications will have a density of about 1.9 g/cc. If this could be reduced by 10 to 20% while maintaining the other excellent properties of unsaturated polyester FRPs, a significant weight savings could be realized.

There have been many approaches to lowering the density of FRP materials. One approach has been to use lower density fillers in the formulations. For example, according to the Kirk-Othmer Encyclopedia of Chemical Technology 1980, wood and shell flour with specific gravity of 0.19 to 1.6 have been used. These have not been completely successful due to the lack of available low density fillers which are cheap, non-hygroscopic and have low coefficients of linear thermal expansion and small particle sizes. A second approach is to simply use less filler. As noted in U.S. Pat. No. 5,246,983, this approach has not been successful because removing filler causes the surface to degrade to the extent that it is no longer acceptable in appearance parts.

A more recent approach in U.S. Pat. No. 5,246,983 uses hollow glass spheres of very low density to compensate for the higher density fillers such as calcium carbonate. However, this approach is not without its problems. If the glass spheres are too large, a rough surface may result. Although U.S. Pat. No. 5,246,983 reveals a method for solving this problem by using small spheres, a more serious problem remains. These FRP parts must be primed and painted to allow the auto manufacturers to match colors and obtain acceptable quality surfaces. In nearly every painting operation, some defects occur, requiring the paint operators to sand and then refinish these blemishes. When an article which contains the glass bubbles is sanded, some of the bubbles are broken. When these areas are then refinished, these broken bubbles cause paint pops (more blemishes). This necessitates more sanding and refinishing, which simply compounds the problem.

An additional problem that faces molders of FRP parts is the cost of the tooling needed to mold acceptable pans. A tool typically is made of machined steel because of the high pressures needed (usually in the range of 800 to 1000 psi) (5.5–6.9 mega Pascals). If a molding compound could be developed which could be molded at lower pressures and still give acceptable surface and low density, lower cost tooling materials could be employed. Therefore, the problem remains as to an effective formulation and process for making lower density FRP parts which have acceptable surface and other properties including paintability, without the sacrifices of the current materials.

The literature generally recognizes the limited usefulness of clay as a filler. It is commonly listed among inorganic fillers useful in sheet molding compounds (SMC) a type of FRP. Clay is usually added as a secondary filler, useful for its rheological properties. It has not been recognized as a useful filler for enhancing surface quality in automotive appearance pans. Research has shown that mixtures of clay and calcium carbonate, for example, provide poor surface quality at low filler levels. In contrast to this, we have found that when clay is used as the sole filler at low levels (typically 10–120 parts based on total resin, in contrast to 180–200 parts calcium carbonate which are typically used) excellent surface quality can be maintained while giving lower density materials. In addition, we have found that these materials can be molded at pressures between 50 and 500 psi (0.34–3.4 mega Pascals) and still give good surface quality. Thus, this invention provides a material and process for producing FRP parts with good surfaces that have not been possible previously.

DETAILED DESCRIPTION OF THE INVENTION

The formulation of this invention is:

a) an unsaturated thermosetting resin, b) an ethylenically unsaturated monomer, c) a thermoplastic low profile additive, d) a kaolin clay filler, e) glass fiber reinforcement, f) an alkaline or alkaline earth oxide thickening agent, g) a free radical initiator, and, optionally, h) inhibitors, pigments, mold release agents, accelerators, and wetting agents.

The unsaturated thermosetting resins include polyesters, vinyl esters, urethane methacrylate and dicyclopentadiene modified polyesters known in the art. The unsaturated polyester resins are typically acid terminated, relatively low molecular weight polymers formed from the condensation reaction between glycols and diacids, of which at least some of the acids must be unsaturated (where unsaturation is defined as having double bonds which are reactive in a free radical curing reaction). The glycols of these polymers can be any of a wide variety of diols. A number of these are listed in *Kirk-Othmer Encyclopedia of Chemical Technology*, Third Edition, Volume 18, pages 575–580 (1982). For example, 1,2 propanediol, 1,2-ethanediol, 2-methyl-1,3-propanediol, 1,4-butanediol, diethylene glycol, triethylene glycol, dipropylene glycol, polypropylene glycol, 1,4-cyclohexanedimethanol, propoxylated and ethoxylated bisphenol A and neopentyl glycol have all been used in the preparation of unsaturated polyesters.

The diacids must have at least some portion of unsaturated diacids, but may also include other known diacids. The common unsaturated diacids or anhydrides include maleic acid and anhydride, fumaric acid; itaconic, citraconic, aconitic, mesaconitic acids and anhydrides and the like. Other acids which can be included in the condensation include adipic, glutaric, succinic, isophthalic, terephthalic, etc. These unsaturated polyesters are generally used at a level of 30–70% of the organic portion of the composition.

The ethylenically unsaturated monomers are used as reactive diluents and may include acrylates and methacrylates such as methyl methacrylate, or 2-ethylhexyl acrylate; styrene, divinyl benzene, or substituted styrenes; and multifunctional acrylates and methacrylates such as ethylene glycol dimethacrylate or trimethylol propanetriacrylate. These reactive monomers are usually present in the range of 20–60% of the organic part of the formulation.

The thermoplastic low profile additives of this invention are those typically known in the art. A number of thermoplastic polymers are known to reduce shrinkage in unsaturated polyesters. These include saturated polyesters, urethane linked saturated polyesters, polyvinylacetate, polyvinylacetate (PVAc) copolymers, acid functional PVAc polymers, acrylate and methacrylate polymers and copolymers, styrene homo- and copolymers including block copolymers with butadienes and saturated butadienes. To be effective in producing surfaces acceptable for the above mentioned applications, the LPAs are used at a level of 8–20% of the total organic resin/monomer/LPA blend.

The filler of this invention is clay. Low levels, typically 10 to 120 parts per 100 parts resin, are used to give the compositions having low density, good surfaces, and low pressure processability. The preferred type of clay is a kaolin clay having an average particle size less than 10 microns. The most preferred filler is kaolin clay having an average particle size less than 5 microns. Preferably, clay filler is used in the range of 40 to 95 parts filler per 100 parts resin. The combination of unsaturated polyester resin, thermoplastic low profile additive and unsaturated monomer equal 100 parts resin.

The alkaline or alkaline earth oxides or hydroxides are those known in the art to cause thickening or maturation of the sheet molding compositions. These commonly are magnesium oxide, calcium oxide, magnesium hydroxide, and the like. By reaction of these thickening agents with the carboxyl termination of the unsaturated polyester and the acid functionality of the LPA, ionic domains are formed which increase the viscosity of the formulation to useable levels.

The free radical initiators, inhibitors, mold release agents, pigments, wetting agents, are typical of those known in the art.

In the following Examples all units are in the metric system and all parts are by weight unless otherwise stated. Also, all references cited herein are expressly incoporated by reference.

PREPARATION OF UNSATURATED POLYESTER RESIN

Maleic anhydride (599 parts) and propylene glycol (510 parts) were reacted at 200° C. in the presence of hydroquinone until an acid value of 30 was reached. The resulting unsaturated polyester was dissolved in styrene (538 parts) containing polymerization inhibitor.

PREPARATION OF THERMOPLASTIC LOW PROFILE ADDITIVE A

Low profile additive (LPA) A was prepared according to the procedures in U.S. Pat. No. 4,421,894, by dissolving Polyol S 102 (377 parts, a butanediol adipate commercially available from RUCO, Hicksville, N.Y.) into inhibited styrene (377 parts). At a temperature of 60° C., dibutyltindithiolaurate catalyst was charged. Toluene diisocyanate (19.5 parts) was charged to the reactor. The urethane reaction was continued until no isocyanate was observed using infrared spectroscopy. Maleic anhydride (4 parts) was charged to the reactor and allowed to react at 65° C. for one hour. Additional styrene (223 parts) was added. Rucoflex 150 polyol (400 parts, an ethylene glycol / butanediol adipate—acid capped polyol, available from RUCO, Hicksville, N.Y.) and additional styrene (600 parts) were then added.

PREPARATION OF LOW PROFILE ADDITIVE B

Acid functional polyvinylacetate (400 parts, number average molecular weight 30,000 to 40,000, available from Air Products and Chemicals, Inc., Allentown, Pa.) was dissolved in free radically inhibited styrene (600 parts).

PREPARATION OF SHEET MOLDING COMPOUND (SMC)

This material is mixed and compounded the way conventional SMC is compounded. The process starts off in the mix area where the unsaturated resin, monomer, and low profile additive are added to the mixing vessel. A free radical initiator such as tertiary butyl peroxybenzoate (1.0–2.5 parts per hundred parts resin—pphr) is added next. Internal mold release such as zinc stearate is added in the compound at quantities in the range of 2.0 to 8.0 parts per hundred parts resin. Lastly, kaolin clay filler is added into the formulation at between 40 and 95 pphr. This mixture is sheared until uniform dispersion and a temperature of 25°–40° C. is achieved. This mixture is the A-side.

In the compounding area, the B-side which contains an alkaline earth thickener material (0.2–3.5 pphr), and, optionally, a carrier resin with or without monomer, is combined with the A-side. This mixture of A and B sides (which is referred to as A/B paste) is deposited into a top and bottom doctor box. The doctor boxes apply a thin layer of the A/B paste mixture onto the carrier film. Chopped glass roving is dropped onto the bottom layer of paste/film and then the top film/paste is laid on top of the glass. This sandwiched layer of A/B paste /glass/A/B paste is then ready to be wet out (encapsulate each strand of chopped glass with the A/B paste mixture) in the compaction area of the SMC machine. After compaction the SMC sheet is either wound into a roll or festooned into a box for maturation (allowing material to thicken to a point where the sheet is easily handleable and able to carry glass during molding) for 2 to 30 days. The material is ready to mold within this time frame.

The material is cut into a charge and the film is peeled off the material. The molding compound is placed in a tool heated to about 150° C. and the press is closed. As the press closes, the compound spreads to fill the tool. Depending on the part, molding pressures are between 0.5 to 8.0 mega Pascals. Cure times are typically the same as for conventional calcium carbonate filled molding compound (0.50–4.0 minutes).

Parts made by this process include vehicle parts and parts for construction. The word "vehicle" is meant here to include cars, trucks, boats, recreational vehicles and personal watercraft.

The density of parts made by this process of this invention is less than 1.85 g/cm³. Preferably, the density is 1.50 to 1.80 g/cm³.

The following examples (see TABLE 1) report the experiments in which use of the compounds filled with kaolin clay filler were compared with calcium carbonate filled compound. The prepared compounds were stored at ambient temperature for three days and then molded.

|  | LOW MASS SMC EXAMPLES | | | | | | |
|---|---|---|---|---|---|---|---|
|  | "A" | "B" | "C" | "D" | "E" | "F" | "G" |
| Unsaturated polyester | 60 | 60 | 60 | 60 | 60 | 60 | 60 |
| LPA |  |  |  |  |  |  |  |
| "A" | 40 | 40 | 0 | 0 | 40 | 40 | 40 |
| "B" | 0 | 0 | 40 | 40 | 0 | 0 | 0 |
| Initiator |  |  |  |  |  |  |  |
| TBPB[1] | 1.5 | 1.5 | 1.5 | 1.5 | 1.5 | 1.5 | 1.5 |
| PDO[2] | 0.3 | 0.3 | 0.3 | 0.3 | 0.3 | 0.3 | 0.3 |
| Zinc Stearate | 4 | 4 | 4 | 4 | 4 | 4 | 4 |
| MgO thickener | 1.5 | 1.3 | 0.8 | 0.8 | 3.4 | 2.4 | 2.2 |
| Filler |  |  |  |  |  |  |  |
| Calcium carbonate[3] | 40 | 0 | 60 | 0 | 40 | 0 | 0 |
| ASP® -400 clay | 40 | 80 | 0 | 60 | 0 | 40 | 40 |
|  | 0 | 0 | 0 | 0 | 0 | 0 | 0 |
|  | 0 | 0 | 0 | 0 | 0 | 0 | 0 |
| Thixotrope |  |  |  |  |  |  |  |
| Aerosil® 200 | 0 | 0 | 0 | 0 | 0 | 0 | 2 |
| 1" Chopped fiberglass, %[5] | 28 | 28 | 28 | 28 | 28 | 28 | 28 |
| Molding viscosity, MM cps[6] | 21 | 24 | 22 | 23 | 21 | 17 | 19 |
| Molding Pressure megaPascal | 7.2 | 3.7 | 3.7 | 3.7 | 1.4 | 1.4 | 1.4 |
| psi | 1042 | 542 | 542 | 542 | 208 | 208 | 208 |
| Ashland Index[7] | 153 | 81 | 364 | 150 | 158 | 143 | 130 |

[1]t-butyl perbenzoate
[2]t-butyl peroxy-2-hexanoate (50% solution in di-octylphthalate)
[3]Commercially available from Georgia Marble Inc. as a 3 to 8 micron particle size calcium carbonate filler.
[4]Commercially available from Engelhard, Edison, NJ ASP® 400 hydrous aluminum silicate.
[5]980 Continuous roving fiberglass available from Owens Corning Fiberglas, Toledo, OH, chopped to 1 inch lengths.
[6]Measured with Brookfield BBT viscometer Model D heliopath and a TF spindle at 1 rpm. MM cps is million centipoise.
[7]Ashland Index is a measure of surface smoothness. Lower numbers indicate better cosmetic appearance and a more accurate reflection of light. These numbers are determined according to General Motors test method GM9314P Ashland LORIA Surface Experiments A and B compare the common practice of blending kaolin clay and calcium carbonate filler with using solely clay. The level of filler used is substantially less than the conventional practice of 150 to 220 pphr. The all clay system exhibits significantly better cosmetic properties than the blend of clay with calcium carbonate filler as measured by the LORIA® surface analyzer.

Experiments C and D directly compare calcium carbonate with clay at a level of 60 pphr. The clay filler system demonstrates significantly better surface quality than the system formulated with calcium carbonate.

Experiments E and F demonstrate the improved surface quality obtained with clay as compared to calcium carbonate at a level of 40 pphr when used with a different low profile additive.

Experiments F and G show the effect of adding fumed silica thixotrope in combination with a low level of clay filler. The combination gave further improvement in surface quality.

Review of the Table demonstrates that a clay filler at levels lower than conventional levels yields better cosmetic properties than one attained with conventional calcium carbonate filler. A surprising benefit of this invention is the superior surface of the clay filler filled compound compared to more conventional filler systems, even at much lower than normal filler levels.

We claim:

1. A process for making molded composite vehicle and construction parts having a density less than 1.85 grams per cm$^3$, comprising the following steps:
   a) admixing unsaturated thermosetting resin, thermoplastic low profile additive, free radical initiator, alkaline earth oxide or hydroxide thickening agent, monomer, and kaolin clay filler having an average particle size less than 10 microns,
   b) forming a paste,
   c) dispensing said paste above and below a bed of chopped roving glass, forming a molding sheet,
   d) consolidating said sheet,
   e) enveloping said sheet in a carrier film,
   f) maturing said sheet until a matured molding viscosity of 3 million to 50 million centipoise is attained and said sheet is non-tacky,
   g) releasing said sheet from said carrier film,
   h) compression molding said sheet into a part in a heated mold under pressure whereby a uniform flow of resin, filler and glass occurs outward to the edges of said part, and
   i) removing said molded part.

2. The process of claim 1 wherein said molded part has a surface smoothness quality less than a 200 Ashland LORIA surface analyzer index.

3. The process of claim 1 wherein step f) molding viscosity is 3 million to 18 million centipoise and step h) compression molding is at a pressure less than 500 psi (3.5 mega Pascals).

4. The process of claim 1 wherein the admixture of step a) further comprises a thixotrope selected from the group of polyamide fiber, bentonite clay, polyolefin fiber, carbon black, polyester fiber, wollastonite, hydrophobic fumed silica and hydrophilic fumed silica.

5. The process of claim 4 wherein said thixotrope is fumed silica.

6. The process of claim 1 wherein the admixture of step a) consists essentially of unsaturated thermosetting resin, thermoplastic low profile additive, free radical initiator, thickening agent, monomer, clay filler, and, fumed silica.

7. The process of claim 2 wherein said molded part has a surface smoothness quality less than a 100 Ashland LORIA analyzer index.

8. The process of claim 1 wherein said clay filler has an average particle size of less than 5.0 microns.

9. The process of claim 1 herein said admixture of step a) comprises
   40 parts resin,
   16 parts thermoplastic low profile additive,
   1.5 parts initiator,
   1 part thickening agent,
   44 parts monomer, and less than 100 parts clay filler and said molding step h) is at less than 250 psi (1.75 mega Pascals).

10. A molded composite vehicle or construction part having a density less than 1.85 grams per cm$^3$ made by the following steps:
    a) admixing unsaturated thermosetting resin, thermoplastic low profile additive, free radical initiator, alkaline earth oxide or hydroxide thickening agent, monomer, and, clay filler having an average particle size less than 10 microns,
    b) forming a paste,
    c) dispensing said paste above and below a bed of chopped roving glass, forming a molding sheet,
    d) consolidating said sheet,
    e) enveloping said sheet in a carrier film,
    f) maturing said sheet until a matured molding viscosity of 3 million to 50 million centipoise is attained and said sheet is non-tacky,
    g) releasing said sheet from said carrier film,
    h) compression molding said sheet into a part in a mold at a under pressure whereby a uniform flow of resin, filler and glass occurs outward to the edges of said part, and
    i) removing said molded pan.

11. The molded part of claim 10 having a surface smoothness quality less than 200 Ashland LORIA surface analyzer index.

12. The part of claim 10 wherein step f) molding viscosity is 3 million to 18 million centipoise and step h) compression molding is at a pressure less than 500 psi (3.5 mega Pascals).

13. The part of claim 10 wherein the admixture of step a) further comprises a thixotrope selected from the group of polyamide fiber, bentonite clay, polyolefin fiber, carbon black, polyester fiber, wollastonite, hydrophoblic fumed silica and hydrophilic fumed silica.

14. The part of claim 10 wherein said thixotrope is hydrophilic fumed silica.

15. The part of claim 10 wherein the admixture of step a) consists essentially of
    thermosetting resin,
    thermoplastic low profile additive,
    free radical initiator,
    thickening agent,
    monomer,
    clay filler, and
    fumed silica.

16. The part of claim 14 having a surface smoothness quality less than a 100 Ashland LORIA surface qualtiy index.

17. The part of claim 10 wherein said clay filler has an average particle size less than 5.0 microns.

18. The part of claim 10 wherein the admixture of step a) comprises
    40 parts resin,
    16 parts thermoplastic low profile additive,
    1.5 parts initiator,
    1 part thickening agent,
    44 parts monomer, and
    less than 100 parts clay filler.

19. The part of claim 10 wherein the molding step h) is at less than 250 psi (1.75 mega Pascals).

* * * * *